3,238,167
POLYMERIC COATING COMPOSITION COMPRISING AN AMINOPLAST AND AN EMULSION COPOLYMER OF AN ETHYLENICALLY UNSATURATED ESTER OF A MONO CARBOXYLIC ACID AND AN ALKYL HALF-ESTER OF ITACONIC ACID
Norwin Wolff, Cambridge, and Thomas B. Pitrolffy-Szabo, Boston, Mass., assignors to A. E. Staley Manufacturing Company, Decatur, Ill., a corporation of Delaware
No Drawing. Filed Oct. 8, 1962, Ser. No. 229,219
14 Claims. (Cl. 260—29.4)

The application is a continuation-in-part of application Serial No. 196,334 filed May 21, 1962.

This invention relates to a novel composition of matter and, more particularly, to a composition of matter capable of producing glossy, continuous, alkali-resistant coatings, the composition comprising a mixture of a polymethylol compound and an alkali soluble copolymer of an alkyl ester of an alpha, beta-ethylenically unsaturated monocarboxylic acid and a monoalkyl ester of itaconic acid.

In application, Serial No. 196,334, filed May 21, 1962, there are disclosed unique thermoplastic emulsion copolymers which dissolve in alkali to form low viscosity solutions. As pointed out in the above application, these copolymers have the following characteristics: (1) can be produced by emulsion polymerization, (2) can be produced in an aqueous medium, (3) can be dissolved at moderately high total solids in dilute alkali without appreciably increasing the viscosity of the polymeric system, (4) can be dissolved at moderately high total solids in alkali to form a viscous polymeric system, (5) can be shipped in either the emulsified form or the solution form at high total solids, (6) can be coated as a water-thin solution or as a viscous solution at moderately high total solids depending upon the desire of the coater, (7) form a freeze-thaw stable solution. The significance of each of these properties is pointed out in the above application. While the above copolymers have all the foregoing advantages, their applied coatings are too alkali sensitive for some uses. The principal object of this invention is to provide a stable, aqueous solution of a dissolved polymethylol compound and a dissolved high molecular weight emulsion copolymer of an alkyl ester of an alpha, beta-ethylenically unsaturated monocarboxylic acid and a monoalkyl ester of itaconic acid which form alkali resistant coatings.

As pointed out in the above application, the first principal component of this invention is a copolymer produced by the aqueous emulsion copolymerization of a monoalkyl ester of itaconic acid and an alkyl ester of an alpha, beta-ethylenically unsaturated monocarboxylic acid. The monoalkyl esters of itaconic acid contain from 1 to 18 carbon atoms in the alkyl group and can be represented by the formula

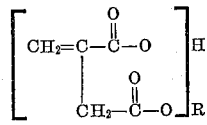

wherein R is a monovalent alkyl group of from 1 to 18 carbon atoms, such as methyl and stearyl. Preferably, R is an unsubstituted alkyl group of from 4 to 8 carbon atoms, such as butyl, hexyl, octyl and 2-ethylhexyl. A particularly preferred class of these copolymers contains monomethyl ester of itaconic acid and a monoalkyl ester of itaconic acid having from 4 to 8 carbon atoms in the alkyl group. As pointed out in the above application, the total of monoalkyl esters itaconic acid comprise from about 5 to 50 mole percent of the polymerizable monomers, and preferably, from about 8 to 20 mole percent.

The alkyl esters of alpha, beta-ethylenically unsaturated monocarboxylic acids which comprise from about 40 to 95 mole percent of the monomeric units in the copolymer include "soft monomers" such as methyl acrylate, ethyl acrylate, isopropyl acrylate, butyl acrylate, amyl acrylate, hexyl acrylate, heptyl acrylate, 2-ethylhexyl acrylate, butyl methacrylate, amyl methacrylate, dodecyl methacrylate, etc., and "hard monomers" such as methyl methacrylate, tertiary butyl methacrylate, cyclohexyl acrylate, hydroxethyl methacrylate, etc., which can be represented by the formula:

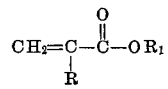

wherein R is methyl or hydrogen; when R is methyl, $R_1$ is an alkyl group of from 1 to 12 carbon atoms and when R is hydrogen, $R_1$ is an alkyl group of from 1 to 8 carbon atoms. The term "soft" is used herein in referring to polymers formed from the monomer alone, in the way that is common in this technology. (See Riddle, "Acrylic Esters," Reinhold Publishing Co., 1954, pp. 58, et seq. Also Patent No. 2,795,564.) Generally, this refers to the "brittle-point" of the polymer, i.e., temperature at which the polymer breaks upon flexing. Polymers of the soft alkyl esters of an alpha, beta-ethylenically unsaturated monocarboxylic acid have brittle points below about 20° C. while the hard esters have brittle points above about 20° C.

In general, the alkyl esters are soft monomers in the above formula when R is hydrogen (acrylic esters) and $R_1$ is a primary or secondary alkyl group of from 1 to 8 carbon atoms or when R is methyl (methacrylic esters) and $R_1$ is a primary or secondary alkyl group of from 4 to 12 carbon atoms. On the other hand, the alkyl esters are hard monomers in the above formula when R is hydrogen and $R_1$ is a tertiary alkyl group or a cycloalkyl group or when R is methyl and $R_1$ is an alkyl group of from 1 to 3 carbon atoms, a tertiary alkyl group or a cycloalkyl group.

As explained in the above application, various other dissimilar copolymerizable ethylenically unsaturated comonomers such as styrene, vinylidene chloride, allyl alcohol, stearyl methacrylate, isoprene, dibutyl itaconate, dimethyl itaconate, etc., can comprise up to about 20 to 40 mole percent of the monomeric unit in the copolymer.

While the copolymer can be composed solely of a monoalkyl ester of itaconic acid and a single alkyl ester of an alpha, beta-ethylenically unsaturated monocarboxylic acid, the preferred copolymers contain at least some soft alkyl ester of an alpha, beta-ethylenically unsaturated monocarboxylic acid and some hard alkyl ester of an alpha, beta-ethylenically unsaturated monocarboxylic acid in addition to the monoalkyl ester of itaconic acid, in order to give the copolymers and coatings based thereon proper balance of hardness, freedom from tack, gloss, flexibility, etc. These copolymers preferably contain from about 20 to 87 mole percent of a soft alkyl ester (preferably at least some ethyl acrylate) from about 5 to 60 mole percent of a hard alkyl ester, and from about 8 to 20 mole percent of a monoalkyl ester of itaconic acid, the total being 100%.

As explained in the above application, the acidic emulsion copolymer can be dissolved by adding alkali to the emulsion to a pH of about 7.2 to 8.0 (clear point pH) to form water thin clear solutions or at a higher pH (above the clear point) to form water thin or viscous solutions. Suitable basic compounds include alkali metal hydroxides such as sodium hydroxide and potassium hydroxide; ammonium hydroxide, amines such as methyl amine, diethyl amine, triethyl amine, tetramethyl ammonium hydroxide; morpholine; etc. The preferred source of alkali is ammonium hydroxide although morpholine, which is also volatile, is only slightly less preferred.

The second principal component in accordance with this invention is a water-soluble or alkali-soluble polymethylol compound such as a water-soluble low molecular weight urea formaldehyde resin or a low molecular weight water-soluble melamine formaldehyde resin. Somewhat more preferred compounds are dimethylol urea, dimethylol ethylene urea, polymethylol melamines, polymethylol melamine ethers. The preferred polymethylol melamine is the hexamethoxy ether of hexamethylol melamine which is sold under the trade name CYMEL-300. The ratio of the polymethylol compound to the copolymer of this invention may be varied over a wide range. For instance, one may use between about 10% to about 50% by weight of the polymethylol material to the corresponding 90% to 50% by weight of the copolymer.

It is not imperative that a catalyst be used with these mixtures of polymethylol compounds and alkali soluble copolymers although one may be used as a matter of choice. The catalyst used may be any of the conventional catalytic materials for curing polymethylol compounds, many of which have been disclosed in the prior art which are water-soluble or at least dispersible in water. The amount of catalyst which may be used obviously can be varied over a considerable range, as the prior art clearly teaches.

These compositions may be applied to all sorts of surfaces for a wide variety of purposes. After application of the composition to a surface, it may be allowed to dry simply by exposure to normal atmospheric air currents. Alternatively, it may be dried by application of heated air, by application of infra-red rays, radio frequency currents, or in any other suitable manner. After drying or during drying, curing is affected by heating to a temperature of about 100° C. to 200° C. or higher for a period of time that generally vary inversely to the temperature and may be from about 10 seconds to an hour or so. The combined factors of temperature and time depend upon the particular substrate used and thickness of coating.

The composition may be pigmented if clear coatings are not desired. For this purpose there may be incorporated into the composition an amount of pigment, extender, filler, delustrant, or the like, such that the weight ratio of the binder solids (polymethylol compound and copolymer) to pigment is 20 to 1 to 1 to 20 depending upon the particular effect desired. Any pigments which are not sensitive to the acid groups of the copolymer may be employed including titanium dioxide, ultramarine blue, zinc oxide, zinc sulfite, barium sulfate, calcium carbonate, zinc chromate, carbon black, etc.

The coatings may be applied to all sorts of surfaces for a wide variety of purposes. They are particularly desirable for application to the surface of metals, such as iron, steel, copper, brass, aluminum, chromium, nickel and the like; to glass, porcelain, other ceramic materials; to articles made of plastic materials such as polyesters, polystyrene, polymers of alkyl acrylates and methacrylate, such as methyl methacrylate or copolymers thereof; wood, textile fabrics, leather, paper, cardboard, etc.

The compositions of the present invention are adapted for the pigment-printing and dyeing of textiles, or finishing of textile fabrics and coating papers with either pigmented or clear coatings or surface sizing. They are characterized by excellent adhesion to all sorts of substrates especially to metals, by good gloss, by hardness, by resistance to attack by solvents, by resistance to heat, by resistance to ultra-violet light, and are further characterized by good cohesion, compatibility, clarity and strength.

The following examples are merely illustrative of the invention and should not be construed as limiting the scope of the invention. The copolymers described were prepared by the method of the copending application referred to before.

EXAMPLE I

A series of aqueous ammoniacal solutions were prepared at 25% total solids with a copolymer composed of 10.6 mole percent monobutyl itaconate, 67.6 mole percent ethyl acrylate and 21.8 mole percent methyl methacrylate, and Aerotex M-3 (a melamine-formaldehyde resin). The samples varied from 0% to 12.5% Aerotex M-3 correspondingly 25 to 12.5% copolymer. Three mil films were cast on tin plates and then dried at 100° C. for 20 minutes. The following tests were run and the results are set forth below in Table I.

Table I

| Test | Percent Aerotex M-3 | | | | | |
|---|---|---|---|---|---|---|
| | 0 | 2.5 | 5 | 7.5 | 10 | 12.5 |
| Stability of aqueous solution at room T. | Over 10 days | Over 10 days | 3 days | 3 days | 3 days | 4 days. |
| Stability of aqueous solution at 50° C. | ___do___ | ___do___ | ___do___ | 2 days | 2 days | 1.5 days. |
| Hardness (Sward) | 14 | 16 | 32 | 38 | 32 | 45. |
| Elongation (⅛" bend) | Passed | Passed | Passed | Failed | Failed | Failed. |
| Impact resistance | Very good | Excellent | Excellent | Good | Fair | Fair. |
| Salt water resistance, 1 day immersion | Fair | Good | ___do___ | Excellent | Excellent | Excellent. |
| Water resistance | ___do___ | ___do___ | ___do___ | ___do___ | ___do___ | Do. |
| 10% NaOH Resistance | Poor | ___do___ | ___do___ | ___do___ | ___do___ | Do. |
| 10% Citric Acid Resistance | Excellent | Excellent | ___do___ | ___do___ | ___do___ | Do. |
| Acetone Resistance | Fair | Good | Good | ___do___ | ___do___ | Good. |
| Alcohol Resistance | ___do___ | Fair | ___do___ | Good | Good | Do. |

The above table indicates that as the concentration of cross-linking agent is increased, the hardness and solvent resistance of the coating increase with attendant decrease in the flexibility and impact resistance of the coating. Likewise, the higher the concentration of the cross-linking agent, the shorter the pot life of the aqueous coating composition. At about 10%-30% by weight Aerotex M-3 of the coating solids, the best balance of film properties was obtained. Essentially the same results were obtained when paper was used as the substrate, and dried at 100° C. for ten minutes.

EXAMPLE II

An aqueous ammoniacal solution of 25% by weight of a copolymer (composed of 10.6 mole percent monobutyl itaconate, 56.7 mole percent ethyl acrylate and 32.7 mole percent methyl methacrylate), 6% by weight Cymel 300 (hexamethyl ether of hexamethylol melamine) and 0.03 percent by weight of ammonium chloride (as a catalyst) was coated on an aluminum substrate and cured at 200° C. for 2 minutes. The coating was not removed after five minutes in boiling water.

EXAMPLE III

An aqueous ammoniacal solution of 25% by weight of a copolymer (composed of 10.6 mole percent monobutyl itaconate, 67.6 mole percent ethyl acrylate and 21.8 mole percent methyl methacrylate), 6% by weight Cymel 300 and 0.30% by weight of the ammonium salt of toluene sulfonic acid was coated on an aluminum substrate and cured at 177° C. for 30 minutes. The coating was not removed after 5 minutes in boiling water.

EXAMPLE IV

An aqueous ammoniacal solution of 17.5 percent by weight of a copolymer (composed of 10.6 mole percent monobutyl itaconate, 67.6 mole percent ethyl acrylate, and 21.8 mole percent methyl methacrylate) and 7.5 percent by weight Cymel 300 at a pH of 8.70 was coated on ribbed paper. The coating was cured at 100° C. for 2½ minutes forming an excellent release coating for pressure sensitive adhesives, e.g., for masking tape.

EXAMPLE V

Example IV was repeated except that the coating was cured at 177° C. for 20 seconds with the same results.

EXAMPLE VI

Example II was repeated with essentially the same results using a copolymer composed of 9.7 mole percent monobutyl itaconate, 1.4 mole percent monomethyl itaconate, 15.1 mole percent methyl methacrylate, 15.1 mole percent ethyl acrylate and 58.6 mole percent methyl acrylate.

Since many embodiments of this invention may be made, and since many changes may be made in the embodiments described, the foregoing is to be interpreted as illustrative only and our invention is defined by the claims amended hereafter.

We claim:
1. A composition of matter capable of producing glossy, continuous, alkali-resistant coatings comprising an aqueous, alkaline solution of (1) 50% to 10% by weight of a dissolved polymethylol compound selected from the group consisting of dimethylol ethylene urea, condensation products of melamine with formaldehyde, condensation products of urea with formaldehyde and mixtures thereof and (2) 50% to 90% by weight of dissolved emulsion copolymer comprising as its two essential monomers from 95 mole percent to 40 mole percent of an alkyl ester of an alpha, beta-ethylenically unsaturated monocarboxylic acid and from 5 to 50 mole percent of an alkyl half-ester of itaconic acid wherein said two essential comonomers comprise at least 60 mole percent of said copolymer.

2. A composition of matter capable of producing glossy, continuous, alkali-resistant coatings comprising an aqueous alkaline solution of (1) 50% to 10% by weight of dissolved polymethylol compound selected from the group consisting of dimethylol ethylene urea, condensation products of melamine with formaldehyde, condensation products of urea with formaldehyde and mixtures thereof and (2) 50% to 90% by weight of a dissolved emulsion copolymer comprising as its two essential ingredients from 95 to 40 mole percent of an alkyl ester of an alpha, beta-ethylenically unsaturated monocarboxylic acid and from 5 to 50 mole percent of an alkyl half-ester of itaconic acid having 4 to 8 carbon atoms in said alkyl half-ester group, wherein said essential two monomers comprise at least 60 mole percent of said copolymer.

3. The composition of claim 2 wherein said copolymer comprises a soft alkyl ester of an alpha, beta-ethylenically unsaturated monocarboxylic acid and a hard alkyl ester of an alpha, beta-ethylenically unsaturated monocarboxylic acid.

4. The composition of claim 2 wherein said solution is an ammoniacal solution.

5. The composition of claim 3 wherein said copolymer comprises ethyl acrylate and methyl methacrylate.

6. The composition of claim 3 wherein said polymethylol compound comprises a low molecular weight melamine formaldehyde condensation product.

7. The composition of claim 3 wherein said polymethylol compound comprises hexamethyl ether of hexamethylol melamine.

8. The process of forming alkali-resistant glossy coatings which comprises depositing on a substrate a thin film of an aqueous, alkaline solution of a composition comprising (1) 50% to 10% by weight of a dissolved polymethylol compound selected from the group consisting of dimethylol ethylene urea, condensation products of melamine with formaldehyde, condensation products of urea with formaldehyde and mixtures thereof and (2) 50% to 90% by weight of dissolved emulsion copolymer comprising as its two essential monomers from 95 mole percent to 40 mole percent of an alkyl ester of an alpha, beta-ethylenically unsaturated monocarboxylic acid and from 5 to 50 mole percent of an alkyl half-ester of itaconic acid wherein said two essential comonomers comprise at least 60 mole percent of said copolymer and drying said film.

9. The process of forming alkali resistant, glossy coatings which comprises depositing on a substrate a thin film of an aqueous, alkaline solution of a composition comprising (1) 50% to 10% by weight of a dissolved polymethylol compound selected from the group consisting of dimethylol ethylene urea, condensation products of melamine with formaldehyde, condensation products of urea with formaldehyde and mixtures thereof and (2) 50% to 90% by weight of dissolved emulsion copolymer compressing as its two essential monomers from 95 mole percent to 40 mole percent of an alkyl ester of an alpha, beta-ethylenically unsaturated monocarboxylic acid and from 5 to 50 mole percent of an alkyl half-ester of itaconic acid having from 4 to 8 carbon atoms in said alkyl half-ester group, wherein said two essential comonomers comprise at least 60 mole percent of said copolymer and drying said film.

10. The process of claim 9 wherein said alkali soluble copolymer comprises a hard alkyl ester of an alpha, beta-ethylenically unsaturated monocarboxylic acid and a soft alkyl ester of an alpha, beta-ethylenically unsaturated monocarboxylic acid.

11. The process of claim 9 wherein said solution is an ammoniacal solution.

12. The process of claim 9 wherein said copolymers comprises ethyl acrylate and methyl methacrylate.

13. The process of claim 9 wherein said polymethylol compound comprises a low molecular weight melamine formaldehyde condensation product.

14. The process of claim 9 wherein said polymethylol compound comprises hexamethyl ether of hexamethylol melamine.

References Cited by the Examiner

UNITED STATES PATENTS

| 2,906,724 | 9/1959 | Daniel | 260—29.4 |
| 3,037,881 | 6/1962 | McDowell | 260—29.6 |

MURRAY TILLMAN, *Primary Examiner.*

J. C. BLEUTGE, *Assistant Examiner.*